(12) United States Patent
Xia

(10) Patent No.: US 12,516,772 B2
(45) Date of Patent: Jan. 6, 2026

(54) AUTOMATIC UNFOLDING FOOT STAND

(71) Applicant: DONGGUAN OSM DIGITAL CO., LTD., Guangdong (CN)

(72) Inventor: Meihua Xia, Dongguan (CN)

(73) Assignee: DONGGUAN OSM DIGITAL CO., LTD., Dongguan (CN)

( * ) Notice: Subject to any disclaimer, the term of this patent is extended or adjusted under 35 U.S.C. 154(b) by 0 days.

(21) Appl. No.: 18/737,057

(22) Filed: Jun. 7, 2024

(65) Prior Publication Data
US 2025/0243967 A1 Jul. 31, 2025

(30) Foreign Application Priority Data
Jan. 29, 2024 (CN) .......................... 202420221663.5

(51) Int. Cl.
*F16M 11/30* (2006.01)
(52) U.S. Cl.
CPC .................................. *F16M 11/30* (2013.01)
(58) Field of Classification Search
CPC ........ F16M 11/30; F16M 11/32; F16M 11/34; F16M 11/36; F16M 11/38; G03B 21/58; G03B 17/561
USPC ......................................................... 248/171
See application file for complete search history.

(56) References Cited

U.S. PATENT DOCUMENTS

| | | | | |
|---|---|---|---|---|
| 5,934,628 A * | 8/1999 | Bosnakovic | ............ | F21V 21/06 248/169 |
| 8,201,979 B2 * | 6/2012 | Deighton | ............... | F16M 11/38 248/177.1 |
| 8,651,438 B2 * | 2/2014 | Deighton | ............... | F16M 11/32 248/163.1 |
| 9,303,853 B2 * | 4/2016 | Deighton | ............ | F16M 11/245 |
| 2012/0261530 A1 * | 10/2012 | Deighton | ............... | F16M 11/38 248/157 |
| 2014/0192543 A1 * | 7/2014 | Deighton | ............... | F16M 11/38 362/419 |
| 2018/0080601 A1 * | 3/2018 | Bosnakovic | ........... | F16M 11/04 |

FOREIGN PATENT DOCUMENTS

| | | |
|---|---|---|
| CN | 221004390 U | 5/2024 |
| CN | 221054715 U | 5/2024 |

OTHER PUBLICATIONS

Search Report dated Dec. 18, 2024 for European Patent application No. 24181714.7.

* cited by examiner

*Primary Examiner* — Christopher Garft
(74) *Attorney, Agent, or Firm* — Maschoff Brennan

(57) ABSTRACT

An automatic unfolding foot stand including a pull rod assembly, an installation sleeve, a plurality of support legs, a fixing base, a plurality of connection rods, a sleeve assembly, and a locking and unlocking mechanism. A first blocking member is arranged on the pull rod assembly; the first slidable sleeve and the second slidable sleeve are respectively slidably sleeved on the pull rod assembly, an elastic component is located between the first slidable sleeve and the second slidable sleeve, a protective sleeve is sleeved on the elastic component, two ends of the protective sleeve are separately connected to the second slidable sleeve and the installation sleeve; and the locking and unlocking mechanism is configured to lock the second end of each of the plurality of the support legs to maintain the support legs in a closed position.

10 Claims, 6 Drawing Sheets

AUTOMATIC UNFOLDING FOOT STAND

TECHNICAL FIELD

The present disclosure relates to the technical field of photographic equipment, and in particular to an automatic unfolding foot stand.

BACKGROUND

The existing support foot stand includes a telescopic rod, a connection seat, a sleeve, support legs, a slidable sleeve, and a connection rod. The sleeve is mounted at the bottom of the connection seat, and the support legs are rotatably arranged on the connection seat and may be unfolded and stored on the sleeve relative to the sleeve; the telescopic rod is inserted into the sleeve from the connection seat; the end of the sleeve and the surface of the telescopic rod limit a sliding space; the slidable sleeve is slidably sleeved on the telescopic rod and is located in the sliding space; and two ends of each connection rod are rotatably connected to the support legs and the slidable sleeve respectively.

However, during usage, a user needs to manually pull the support legs of the support foot stand to an unfolding position, which is time-consuming and labor-intensive.

SUMMARY OF THE INVENTION

The main purpose of the present disclosure is to provide an automatic unfolding foot stand, which is designed to realize the function of automatically ejecting support legs with one button to improve the convenience of usage.

In order to achieve the above objective, the present disclosure proposes a foot stand, which includes:
- a pull rod assembly, wherein a first blocking member is arranged on an outer peripheral wall of the pull rod assembly;
- an installation sleeve, slidably sleeved on the pull rod assembly;
- a plurality of support legs, wherein one end of each support leg is rotatably arranged on the installation sleeve;
- a fixing base, mounted at the bottom of the pull rod assembly, wherein a second blocking member is arranged on the fixing base;
- a plurality of connection rods, in one-to-one correspondence with the support legs, wherein a first end of each connection rod is rotatably arranged on one of the support legs, and a second end of each connection rod is rotatably arranged on the fixing base;
- a sleeve assembly, including a protective sleeve, a first slidable sleeve, a second slidable sleeve, and an elastic component, wherein the first slidable sleeve and the second slidable sleeve are respectively slidably sleeved on the pull rod assembly, the elastic component is sleeved on the pull rod assembly and is located between the first slidable sleeve and the second slidable sleeve, the protective sleeve is sleeved on the elastic component, a first end of the protective sleeve is connected to the second slidable sleeve, and a second end of the protective sleeve is connected to the installation sleeve; and
- a locking and unlocking mechanism, arranged at the bottom of the pull rod assembly, wherein the locking and unlocking mechanism is configured to lock the second end of each of the plurality of support legs to maintain the support legs in a closed position, and also configured to unlock the second end of each of the plurality of the support legs to allow the support legs to automatically unfold to an open position; and in the closed position, the first slidable sleeve abuts against the first blocking member, and in the open position, the second slidable sleeve abuts against the second blocking member.

In an embodiment, the first blocking member is a plurality of protrusions protruding from the outer peripheral wall of the pull rod assembly.

In an embodiment, the second blocking member is a plurality of bosses protruding from the fixing base, a plurality of mounting holes are arranged on the outer peripheral wall of the pull rod assembly, and the plurality of bosses are clamped in the plurality of mounting holes in one-to-one correspondence to fix the fixing base on the bottom of the pull rod assembly.

In an embodiment, the elastic component is a spring or an elastic telescopic bellow.

In an embodiment, the second end of the protective sleeve connected to the installation sleeve is provided with a plurality of connection lugs, the connection lugs are each provided with a connection hole, a circular truncated cone matching the connection hole is arranged on the installation sleeve at a position corresponding to the connection hole, and the circular truncated cone is clamped in the connection hole to fix the second end of the protective sleeve onto the installation sleeve.

In an embodiment, the locking and unlocking mechanism includes a button, a button holder, and a spring, the button holder is provided with a connection column, the connection column is fastened to the fixing base by a screw bolt, the button is pressably arranged on the button holder, and the spring is sleeved on the connection column and abuts against the button.

In an embodiment, the second end of each of the plurality of support legs is provided with a locking protrusion, the button is provided with a locking hole configured to engage with the locking protrusion in a locking manner, and in the closed position, the locking protrusion is clamped in the locking hole; or the second end of each of the plurality of support legs is provided with a locking hole, the button is provided with a locking protrusion configured to engage with the locking hole in a locking manner, and in the closed position, the locking protrusion is clamped in the locking hole.

In an embodiment, the locking and unlocking mechanism further includes a decorative piece, the decorative piece is arranged on the button, and the decorative piece is provided with an anti-slip texture.

In an embodiment, a connection seat is arranged on the top of the pull rod assembly, and a connection screw is arranged on the connection seat for connecting to an external photographing device.

In an embodiment, the pull rod assembly includes two or more pull rods interconnected in sequence.

In the technical solution of the present disclosure, the foot stand includes a pull rod assembly, an installation sleeve, a plurality of support legs, a fixing base, a plurality of connection rods, a sleeve assembly, and a locking and unlocking mechanism. A first blocking member is arranged on an outer peripheral wall of the pull rod assembly; the installation sleeve is slidably sleeved on the pull rod assembly; one end of each of a plurality of support legs is rotatably arranged on the installation sleeve, the fixing base is mounted at the bottom of the pull rod assembly, wherein a second blocking member is arranged on the fixing base; the plurality of connection rods are in one-to-one correspondence with the support legs, wherein a first end of each connection rod is rotatably arranged on one of the support legs, and a second end of each connection rod is rotatably arranged on the fixing base; the sleeve assembly includes a protective sleeve, a first slidable sleeve, a second slidable sleeve, and an elastic component, the first slidable sleeve and the second slidable sleeve are respectively slidably sleeved on the pull rod assembly, the elastic component is sleeved on the pull rod assembly and is located between the first slidable sleeve and the second slidable sleeve, the protective sleeve is sleeved on the elastic component, a first end of the protective sleeve is connected to the second slidable sleeve and a second end of the protective sleeve is connected to the installation sleeve; the locking and unlocking mechanism is disposed at the bottom of the pull rod assembly; and the locking and unlocking mechanism is configured to lock the second end of each of the plurality of the support legs to maintain the support legs in a closed position, and also configured to unlock the second end of each of the plurality of the support legs to allow the support legs to automatically unfold to an open position; and in the closed position, the first slidable sleeve abuts against the first blocking member, and in the open position, the second slidable sleeve abuts against the second blocking member.

It can be understood that when in use, a user only need to manually operate the locking and unlocking mechanism to unlock the other end of the support legs, so that the support legs are separated from the locking and unlocking mechanism, and automatically ejects to the open position under the action of the elastic component, achieving a function of automatically ejecting the support legs with one button and effectively improving the convenience of usage.

In addition, since a protective sleeve is sleeved on the outer circumference of the elastic component, the elastic component may be covered to prevent the elastic component from being exposed and affecting safety and aesthetics. Moreover, two ends of the protective sleeve are connected to the second slidable sleeve and the installation sleeve respectively, realizing the linkage between the sleeve assembly and the installation sleeve. After unlocking the support legs, the elastic component returns from the compressed state to its original state, and pushes the second slidable sleeve and causes the installation sleeve to slide downward, thereby driving the support legs to expand to the open position.

BRIEF DESCRIPTION OF THE DRAWINGS

In order to more clearly describe the technical solutions in the embodiments of the present disclosure or in the related art, the drawings required for describing the embodiments or the related art will be briefly described below. Apparently, the drawings in the following description show only some of the embodiments of the present disclosure, and those of ordinary skill in the art may still derive other drawings from these drawings without creative works.

EXPLANATION OF REFERENCE NUMBERS

Figure 1:
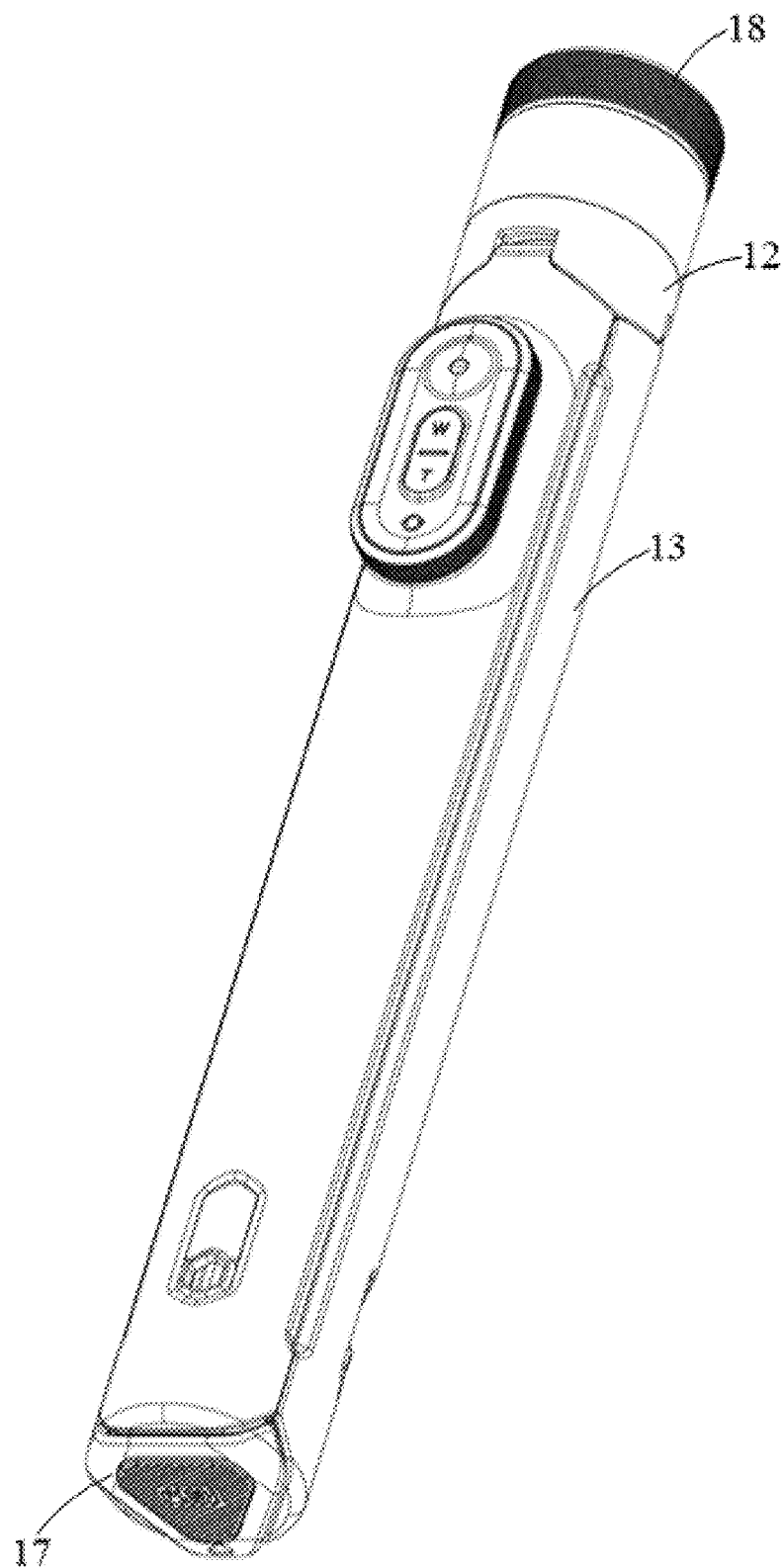
FIG. 1 is a schematic structural diagram in which support legs are in a closed state according to an embodiment of a foot stand of the present disclosure.

11. Pull rod assembly; 12. Installation sleeve; 13. Support leg; 14. Fixing base; 15. Connection rod; 16. Sleeve assembly; 17. Locking and unlocking mechanism; 18. Connection seat; 111. First blocking member; 141. Second blocking member; 161. Protective sleeve; 162. First slidable sleeve; 163. Second slidable sleeve; 164. Elastic component; 1611. Connection lug; 161a. Connection hole; 171. Button; 172. Button fixing base; 173. Decorative piece; 202 Mounting holes; Circular truncated cone 204; Matching circular truncated cone 205; Spring 206; Connection column 208; Screw bolt 210; Locking protrusion 212; and Locking hole 214.

The realization of the purpose, functional features and advantages of the present disclosure will be further described with reference to the embodiments and the accompanying drawings.

DETAILED DESCRIPTION

The following clearly and completely describes the technical solutions in the embodiments of the present application with reference to accompanying drawings in the embodiments of the present application. Apparently, the described embodiments are merely a part rather than all of the embodiments of the present application. All other embodiments obtained by a person of ordinary skill in the art based on the embodiments of the present disclosure without creative efforts shall fall within the protection scope of the present disclosure.

It should be noted that if there are directional indications (for example, above, below, left, right, front, and back) in the embodiments of the present disclosure, the directional indications are only used to explain relative positional relationship, movement, or the like between the components in a specific posture (as shown in the accompanying drawings). If the specific posture changes, the directional indication will also change accordingly.

In the description of the present disclosure, it should be noted that, unless otherwise clearly stated and limited, the terms "installation", "interconnection" and "connection" should be understood in a broad sense. For example, "connection" may be a fixed connection, a detachable connection, or an integral connection; may be a mechanical connection or an electrical connection; or may be a direct connection or an indirect connection by means of an intermediate medium, or an internal connection between two elements. For a person of ordinary skill in the art, specific meanings of the foregoing terms in the present disclosure may be understood based on specific situations.

In addition, if there are descriptions involving "first", "second", or the like in the embodiments of the present disclosure, the descriptions of "first", "second", or the like are only for descriptive purposes and shall not be understood as indications or implications of relative importance or implicit indication of the number of technical features indicated. Therefore, a feature restricted by "first" or "second" may explicitly indicate or implicitly include at least one of such features. In addition, if "and/or" appears in the full text, it means including three parallel plans. For example, "A and/or B" includes plan A, or plan B, or plan A and plan B. In addition, the technical solutions in various embodiments may be combined with each other, but it must be based on the implementation by those of ordinary skill in the art. When the combination of technical solutions is contradictory or cannot be implemented, it should be considered that such a combination of technical solutions does not exist, and is not within the protection scope required by the present disclosure.

The present disclosure proposes an automatic unfolding foot stand, which is suitable for supporting equipment such as mobile phones, cameras, video cameras, or projectors, but this constitutes no limitation herein.

Referring to FIG. 1 to FIG. 4, in an embodiment of the present disclosure, the foot stand includes a pull rod assembly 11, an installation sleeve 12, a plurality of support legs 13, a fixing base 14, a plurality of connection rods 15, a sleeve assembly 16, and a locking and unlocking mechanism 17. A first blocking member 111 is arranged on an outer peripheral wall of the pull rod assembly 11; the installation sleeve 12 is slidably sleeved on the pull rod assembly 11; one end of each of a plurality of support legs 13 is rotatably arranged on the installation sleeve 12, the fixing base 14 is mounted at the bottom of the pull rod assembly 11, wherein a second blocking member 141 is arranged on the fixing base 14; the plurality of connection rods 15 are in one-to-one correspondence with the support legs 13, wherein a first end of each connection rod 15 is rotatably arranged on one of the support legs 13, and a second end of each connection rod 15 is rotatably arranged on the fixing base 14; the sleeve assembly 16 includes a protective sleeve 161, a first slidable sleeve 162, a second slidable sleeve 163, and an elastic component 164, the first slidable sleeve 162 and the second slidable sleeve 163 are respectively slidably sleeved on the pull rod assembly 11, the elastic component 164 is sleeved on the pull rod assembly 11 and is located between the first slidable sleeve 162 and the second slidable sleeve 163, the protective sleeve 161 is sleeved on the elastic component 164, a first end of the protective sleeve 161 is connected to the second slidable sleeve 163 and a second end of the protective sleeve 161 is connected to the installation sleeve 12; the locking and unlocking mechanism 17 is arranged at the bottom of the pull rod assembly 11; and the locking and unlocking mechanism 17 is configured to lock the second end of each of the plurality of the support legs 13 to maintain the support legs in a closed position, and also configured to unlock the second end of each of the plurality of the support legs 13 to allow the support legs to automatically unfold to an open position; and in the closed position, the first slidable sleeve 162 abuts against the first blocking member 111, and in the open position, the second slidable sleeve 163 abuts against the second blocking member 141.

In this embodiment, the number of support legs 13 is at least three, which is not limited herein.

The outer peripheral wall of the pull rod assembly 11 may be provided with a slide groove for the installation sleeve 12 and the sleeve assembly 16 to slide. Correspondingly, the inner peripheral walls of the installation sleeve 12, the first slidable sleeve 162, and the second slidable sleeve 163 may be provided with sliding ribs to facilitate sliding, thereby improving the smoothness of the automatic ejection of the support legs 13.

Figure 2:
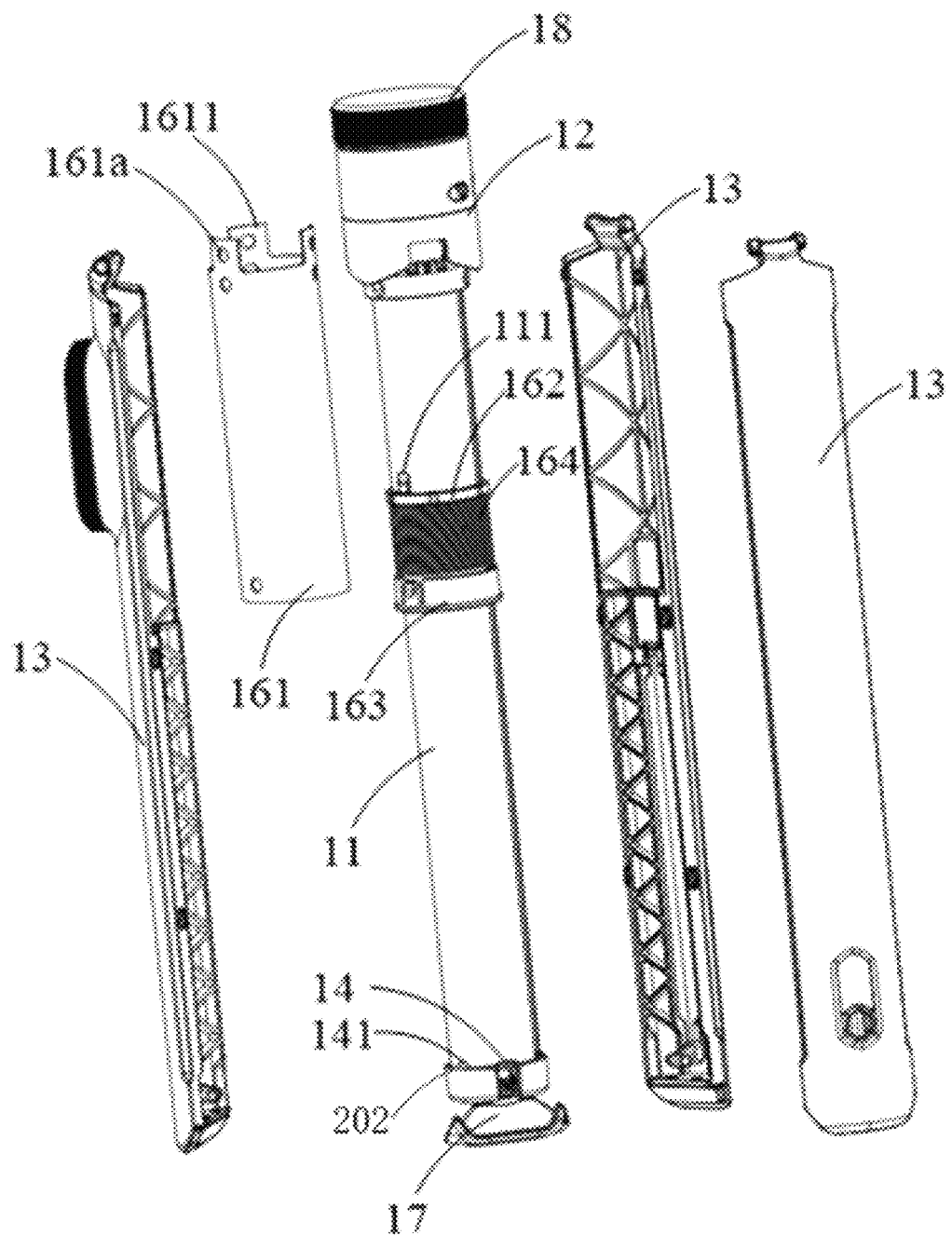
FIG. 2 is an exploded view in which support legs are in a closed state according to an embodiment of a foot stand of the present disclosure.
Figure 3:
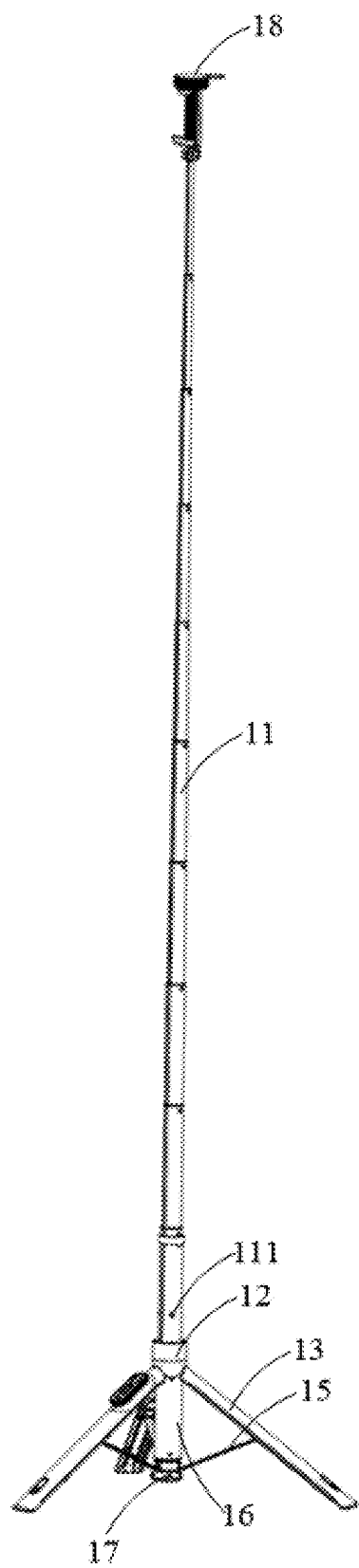
FIG. 3 is a schematic structural diagram in which support legs are in an unfolding state according to an embodiment of a foot stand of the present disclosure.
Figure 4:
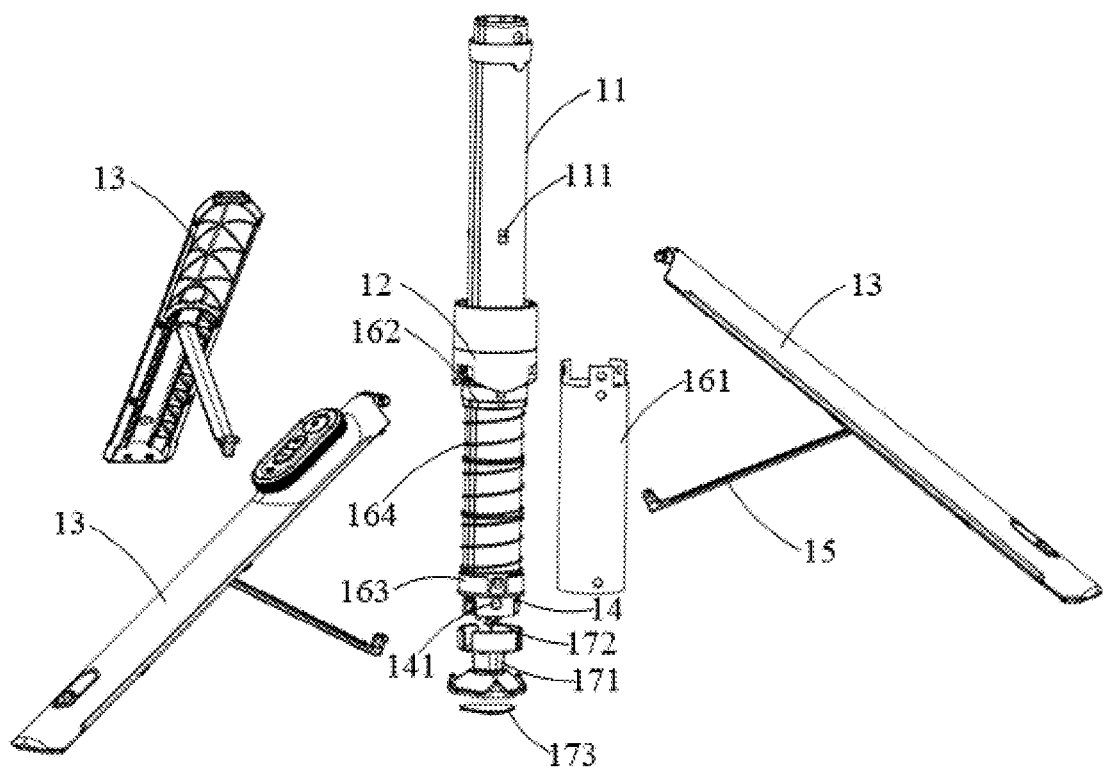
FIG. 4 is an exploded view in which support legs are in an unfolding state according to an embodiment of a foot stand of the present disclosure.

The elastic component 164 may be selected as a metal or plastic spring (e.g., as illustrated in FIG. 4), an elastic telescopic bellow (e.g., as illustrated in FIG. 2), or the like, and is preferably a compression spring, which is not limited herein.

In order to unfold each support leg 13 to a suitable angle to ensure support stability, in this embodiment, the first blocking member 111 may be a plurality of protrusions protruding on the outer peripheral wall of the pull rod assembly 11.

Similarly, the second blocking member 141 may be a plurality of bosses protruding on the fixing base 14. In order to facilitate assembly and make full use of each boss, a plurality of mounting holes 202 are arranged on the outer peripheral wall of the pull rod assembly 11, and a plurality of bosses are clamped in a plurality of 111 holes in one-to-one correspondence to fix the fixing base 14 to the bottom of the pull rod assembly 11.

It can be understood that when in use, a user only need to manually operate the locking and unlocking mechanism 17 to unlock the other end of the support legs 13, so that the support legs 13 are separated from the locking and unlocking mechanism 17, and automatically ejects to the open position under the action of the elastic component 164, achieving a function of automatically ejecting the support legs 13 with one button and effectively improving the convenience of usage.

In addition, since a protective sleeve 161 is sleeved on the outer circumference of the elastic component 164, the elastic component 164 may be covered to prevent the elastic component 164 from being exposed and affecting safety and aesthetics. Moreover, two ends of the protective sleeve 161 are connected to the second slidable sleeve 163 and the installation sleeve 12 respectively, realizing the linkage between the sleeve assembly 16 and the installation sleeve 12. After unlocking the support legs 13, the elastic component 164 returns from the compressed state to its original state, and pushes the second slidable sleeve 163 and causes the installation sleeve 12 to slide downward, thereby driving the support legs 13 to expand to the open position.

In order to improve the convenience and reliability of assembling the protective sleeve 161 and the installation sleeve 12, mainly referring to FIG. 2, in an embodiment, the second end of the protective sleeve 161 connected to the installation sleeve 12 is provided with a plurality of connection lugs 1611, the connection lugs 1611 are each provided with a connection hole 161a, a circular truncated cone 204 matching the connection hole 161a is arranged on the installation sleeve 12 at a position corresponding to the connection hole 161a, and the circular truncated cone 204 is clamped in the connection hole 161a to fix the second end of the protective sleeve 161 onto the installation sleeve 12.

Figure 5:
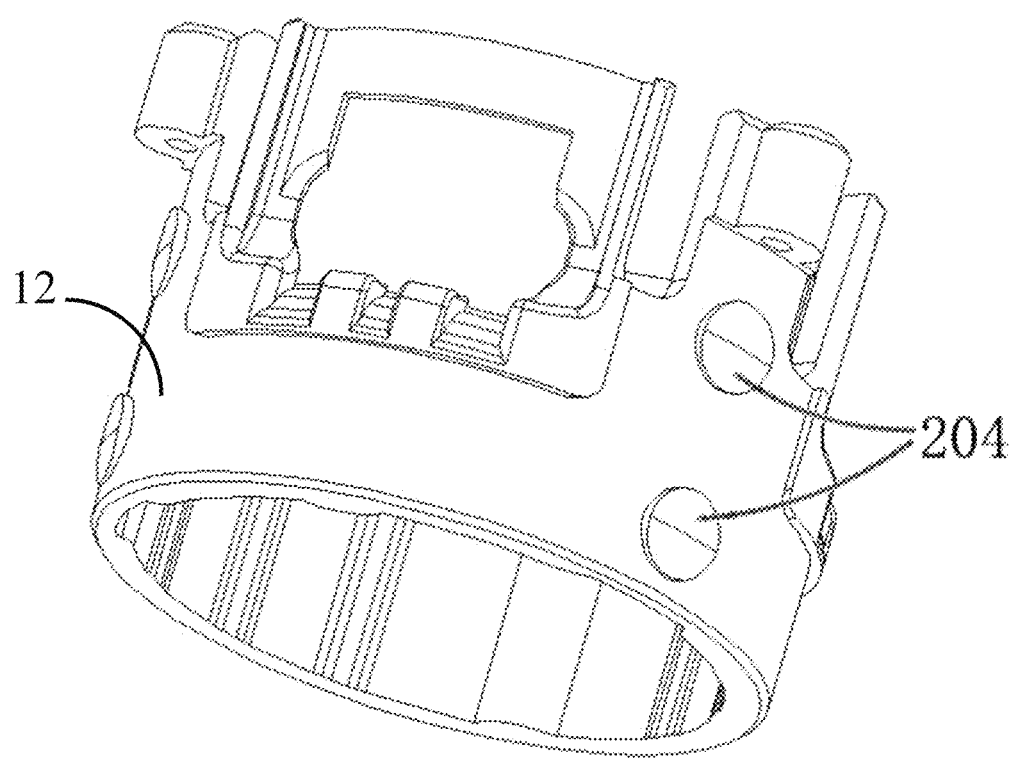
FIG. 5 is an example installation sleeve according to an embodiment of a foot stand of the present disclosure.

In this embodiment, the body of the protective sleeve 161 below the connection lug 1611 may also be provided with a connection hole 161a. Correspondingly, a circular truncated cone 204 matching the connection hole 161a may also be arranged at the corresponding position on the installation sleeve 12 to further improve the reliability of connection between the two parts (e.g., as illustrated in FIG. 5).

Figure 6:
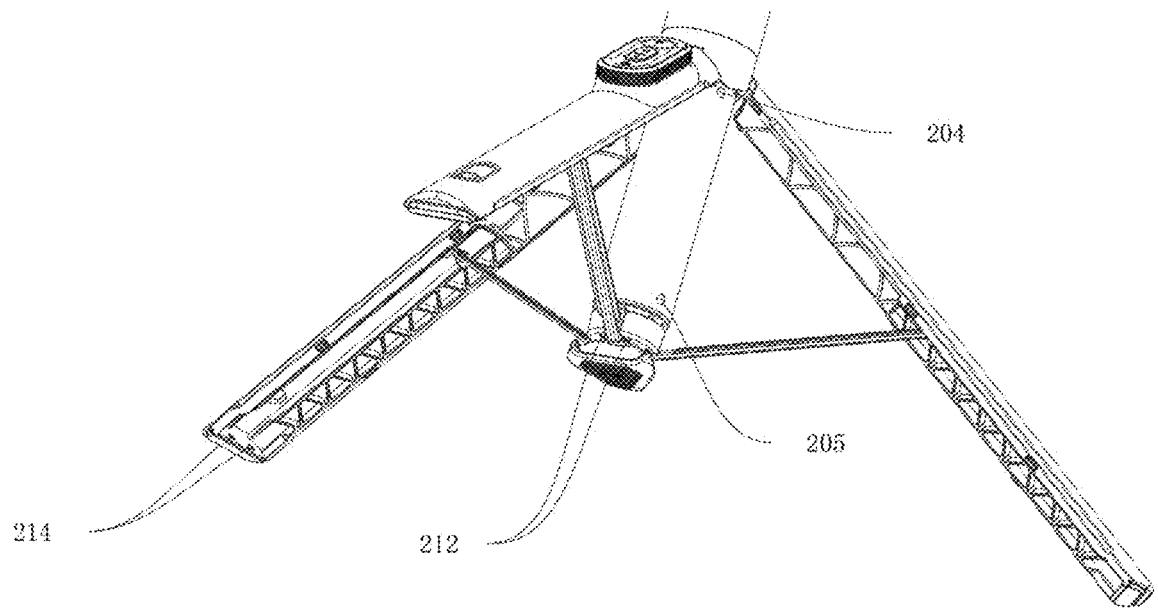
FIG. 6 is another schematic structural diagram of support legs in an unfolding state according to an embodiment of a foot stand of the present disclosure.

Further, as shown in FIG. 2, a connection hole 161a may also be arranged at a first end of the protective sleeve 161 connected to the second slidable sleeve 163, and a matching circular truncated cone 205 (e.g., as illustrated in FIG. 6) may be arranged on the second slidable sleeve 163 to facilitate the connection between the protective sleeve 161 and the second slidable sleeve 163, thereby improving the convenience and reliability of connection between the two parts.

Figure 7:
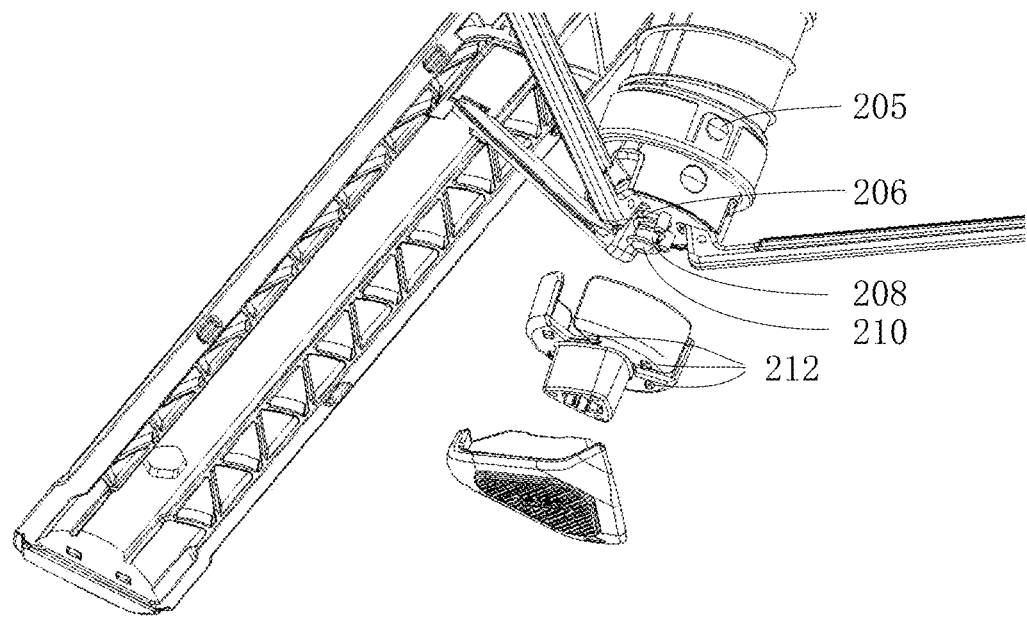
FIG. 7 is another exploded view in which support legs are in an unfolding state according to an embodiment of a foot stand of the present disclosure.

In order to further improve the convenience of operation, in conjunction with FIG. 2 and FIG. 4, in an embodiment, the locking and unlocking mechanism 17 may include a button 171, a button holder 172, and a spring 206, the button holder 172 is provided with a connection column 208, the connection column 208 is fastened to the fixing base 14 by a screw bolt 210, the button 171 is pressably arranged on the button holder 172, and the spring 206 is sleeved on the connection column 208 and abuts against the button 171 (e.g., as illustrated in FIG. 7).

In usage, the user only needs to press the button 171 to unlock each support leg 13, so that the end of the support legs 13 is separated from the locking and unlocking mechanism 17, and then under the action of the elastic component 164, each support leg 13 automatically unfolds to the open position.

In this embodiment, the second end of each of the plurality of support legs 13 is provided with a locking protrusion 212, the button 171 is provided with a locking hole 214 (e.g., as illustrated in FIG. 6) configured to engage with the locking protrusion 212 in a locking manner, and in the closed position, the locking protrusion 212 is clamped in the locking hole 214.

Certainly, a locking hole 214 may also be arranged at one end of each of the support legs 13, and a locking protrusion 212 adapted to the locking hole 214 may be arranged on the button 171. Any structure is acceptable as long as the ends of the support legs 13 may be locked at the bottom of the pull rod assembly 11 and the two may be separated after pressing to unlock.

Further, as shown in FIG. 4, the locking and unlocking mechanism 17 further includes a decorative piece 173, the decorative piece 173 is arranged on the button 171, and the decorative piece 173 is provided with an anti-slip texture, to increase friction resistance and facilitate users to press the button 171.

In some embodiments, a connection seat 18 is arranged on the top of the pull rod assembly 11, and a connection screw is arranged on the connection seat 18 for connecting to an external photographing device and other photographing devices, for example, standard screws such as ¼ or ⅜ may be selected.

In addition, in order to meet the support requirements of more application scenarios, in some embodiments, the pull rod assembly 11 may include two or more sections of pull rods interconnected in sequence to facilitate adjustment of the support height and make it more user-friendly.

The above are only optional embodiments of the present disclosure, and do not thereby limit the patent scope of the present disclosure. Under the inventive concept of the present disclosure, equivalent structural transformations may be made using the contents of the specification and accompanying drawings of the present disclosure, or direct/indirect applications in other related technical fields are included in the patent protection scope of the present disclosure.

The invention claimed is:

1. A foot stand, comprising:
    a pull rod assembly, wherein a first blocking member is arranged on an outer peripheral wall of the pull rod assembly;
    an installation sleeve, slidably sleeved on the pull rod assembly;
    a plurality of support legs, wherein one end of each support leg is rotatably arranged on the installation sleeve;
    a fixing base, mounted at the bottom of the pull rod assembly, wherein a second blocking member is arranged on the fixing base;
    a plurality of connection rods, in one-to-one correspondence with the support legs, wherein a first end of each connection rod is rotatably arranged on one of the support legs, and a second end of each connection rod is rotatably arranged on the fixing base;
    a sleeve assembly, comprising a protective sleeve, a first slidable sleeve, a second slidable sleeve, and an elastic component, wherein the first slidable sleeve and the second slidable sleeve are respectively slidably sleeved on the pull rod assembly, the elastic component is sleeved on the pull rod assembly and is located between the first slidable sleeve and the second slidable sleeve, the protective sleeve is sleeved on the elastic component, a first end of the protective sleeve is connected to the second slidable sleeve, and a second end of the protective sleeve is connected to the installation sleeve; and
    a locking and unlocking mechanism, arranged at the bottom of the pull rod assembly, wherein the locking and unlocking mechanism is configured to lock the second end of each of the plurality of the support legs to maintain the support legs in a closed position, and also configured to unlock the second end of each of the plurality of the support legs to allow the support legs to automatically unfold to an open position; wherein in the closed position, the first slidable sleeve abuts against the first blocking member, and in the open position, the second slidable sleeve abuts against the second blocking member.

2. The foot stand according to claim 1, wherein the first blocking member is a plurality of protrusions protruding from the outer peripheral wall of the pull rod assembly.

3. The foot stand according to claim 1, wherein the second blocking member is a plurality of bosses protruding from the fixing base, a plurality of mounting holes are arranged on the outer peripheral wall of the pull rod assembly, and the plurality of bosses are clamped in the plurality of mounting holes in one-to-one correspondence to fix the fixing base on the bottom of the pull rod assembly.

4. The foot stand according to claim 1, wherein the elastic component is a spring or an elastic telescopic bellow.

5. The foot stand according to claim 1, wherein the second end of the protective sleeve connected to the installation sleeve is provided with a plurality of connection lugs, the connection lugs are each provided with a connection hole, a circular truncated cone matching the connection hole is arranged on the installation sleeve at a position corresponding to the connection hole, and the circular truncated cone is clamped in the connection hole to fix the second end of the protective sleeve onto the installation sleeve.

6. The foot stand according to claim 1, wherein the locking and unlocking mechanism comprises a button, a button holder, and a spring, the button holder is provided with a connection column, the connection column is fastened to the fixing base by a screw bolt, the button is pressably arranged on the button holder, and the spring is sleeved on the connection column and abuts against the button.

7. The foot stand according to claim 6, wherein the second end of each of the plurality of support legs is provided with a locking protrusion, the button is provided with a locking hole configured to engage with the locking protrusion in a locking manner, and in the closed position, the locking protrusion is clamped in the locking hole; or the second end of each of the plurality of support legs is provided with a locking hole, the button is provided with a locking protrusion configured to engage with the locking hole in a locking manner, and in the closed position, the locking protrusion is clamped in the locking hole.

8. The foot stand according to claim 6, wherein the locking and unlocking mechanism further comprises a decorative piece, the decorative piece is arranged on the button, and the decorative piece is provided with an anti-slip texture.

9. The foot stand according to claim 1, wherein a connection seat is arranged on the top of the pull rod assembly for connecting to an external photographing device.

10. The foot stand according to claim 1, wherein the pull rod assembly comprises two or more pull rods interconnected in sequence.

* * * * *